United States Patent
Lee et al.

(10) Patent No.: US 8,170,015 B2
(45) Date of Patent: May 1, 2012

(54) INTEGRATED GATEWAY APPARATUS AND COMMUNICATIONS METHOD

(75) Inventors: Kwangil Lee, Daejeon (KR); Jun Hee Park, Daejeon (KR); Chang Eun Lee, Daejeon (KR); Kyeong Deok Moon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 337 days.

(21) Appl. No.: 12/548,648

(22) Filed: Aug. 27, 2009

(65) Prior Publication Data

US 2010/0135308 A1    Jun. 3, 2010

(30) Foreign Application Priority Data

Dec. 1, 2008  (KR) .................. 10-2008-0120796
Apr. 29, 2009 (KR) .................. 10-2009-0037606

(51) Int. Cl.
*H04L 12/28* (2006.01)
(52) U.S. Cl. .................. 370/389; 370/466; 701/209
(58) Field of Classification Search .................. 370/466, 370/389; 701/208, 209, 213
See application file for complete search history.

(56) References Cited

U.S. PATENT DOCUMENTS

| 7,099,755 | B2 | 8/2006 | Mueller et al. | |
| 2003/0050751 | A1* | 3/2003 | Fukushima et al. | 701/202 |
| 2008/0198861 | A1 | 8/2008 | Makela | |
| 2009/0067336 | A1* | 3/2009 | Cho et al. | 370/238 |

FOREIGN PATENT DOCUMENTS

| KR | 1020010097908 A | 11/2001 |
| KR | 1020050106237 A | 11/2005 |
| KR | 1020070045566 A | 5/2007 |

* cited by examiner

*Primary Examiner* — Jung Park
(74) *Attorney, Agent, or Firm* — Ladas & Parry LLP

(57) ABSTRACT

An integrated gateway apparatus includes a policy storage for storing therein a first information on message filtering and switching policies for messages received from heterogeneous devices in lower networks via network interfaces; a device management unit for extracting a second information on the messages, the devices and the network interfaces; a layer-basis filter unit for performing, based on the first and the second information, the message filtering and switching on the messages on a layer basis; and an integrated switch management unit for providing the first information to the layer-basis filter unit and controlling the layer-basis filtering unit. The layer-basis filter unit includes a switch filter unit, a route filter unit and a gateway filter unit for performing the message filtering and switching in a MAC layer, in a network layer and a transport layer and in an application layer, respectively.

16 Claims, 4 Drawing Sheets

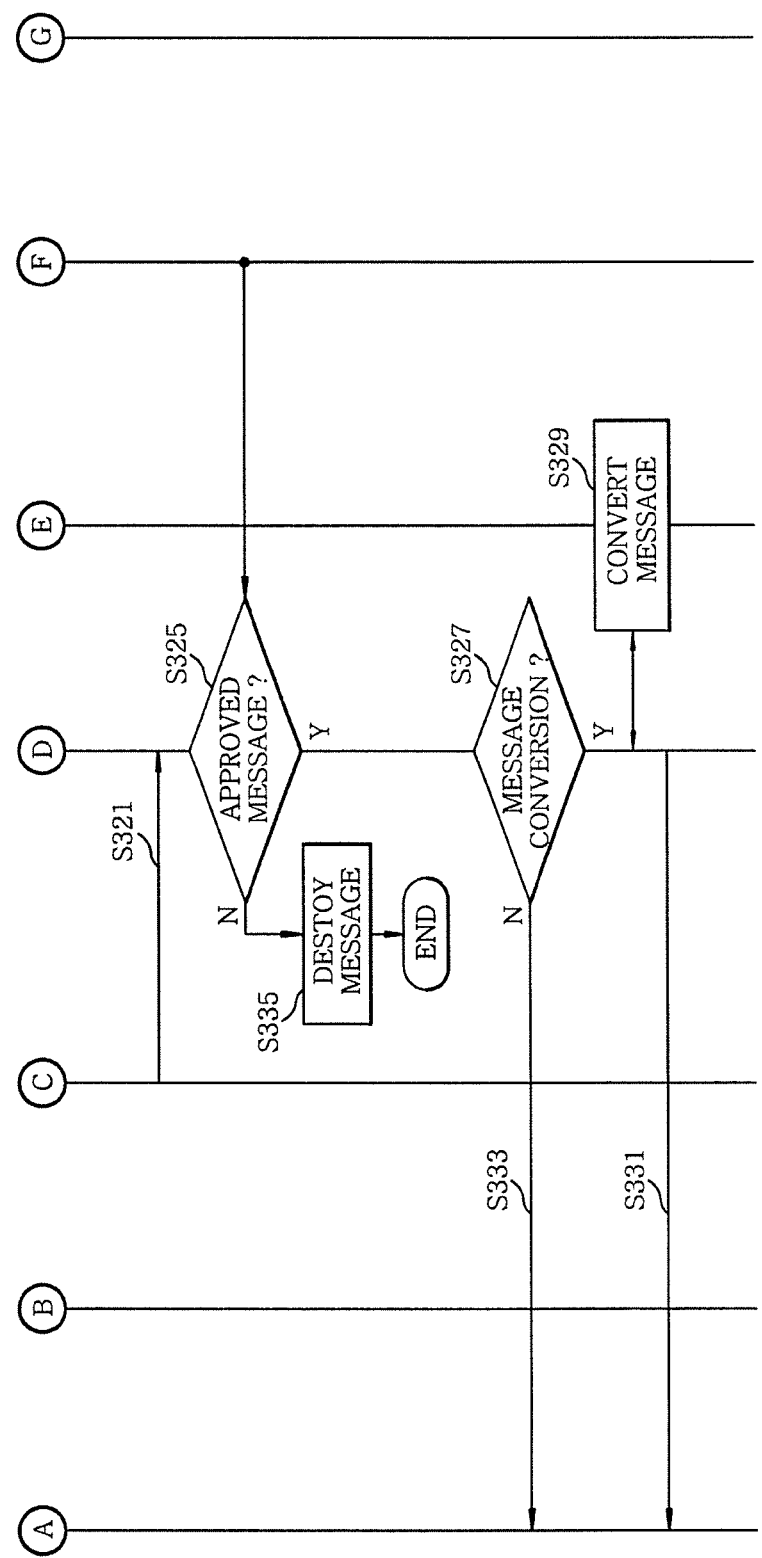

INTEGRATED GATEWAY APPARATUS AND
COMMUNICATIONS METHOD

CROSS-REFERENCE(S) TO RELATED APPLICATION(S)

The present invention claims priority of Korean Patent Application No. 10-2008-0120796, filed on Dec. 1, 2008, and Korean Patent Application No. 10-2009-0037606, filed on Apr. 29, 2009, which are incorporated herein by reference.

FILED OF THE INVENTION

The present invention relates to an integrated gateway apparatus and communications method; and, more particularly, to an integrated gateway apparatus and communications method, in which the integrated gateway apparatus analyzes traffic of devices connected thereto to determine based on analysis result whether to approve messages or not and switches approved messages to respective destinations.

BACKGROUND OF THE INVENTION

As well known in the art, a gateway apparatus in a ship supports management and monitoring of devices in the ship, thereby improving stability of navigation and minimizing navigational errors.

In recent, gateway apparatuses in ships are being developed to operate in a wide area network based on, e.g., a fieldbus protocol and Ethernet protocol, while conventional gateway apparatuses in ships work in a local area network. Further, gateway apparatuses in ships are being developed to integratedly manage devices in a ship which have operated individually.

However, conventional gateway apparatuses in ships have a drawback in that data generated in a device is unnecessarily delivered to other devices or excessive traffic generation in a device causes performance degradation of other devices.

Further, delivery of important data to unapproved devices or users in conventional gateway apparatuses in ships exposes devices in a ship to dangers, e.g., access and control by an unapproved user.

SUMMARY OF THE INVENTION

In view of the above, the present invention provides an integrated gateway apparatus and communications method, in which the integrated gateway apparatus analyzes traffic of devices connected thereto to determine based on analysis result whether to approve messages or not and switches approved messages to respective destinations.

In accordance with an aspect of the present invention, there is provided an integrated gateway apparatus, the apparatus including:

a policy storage for storing therein a first information on message filtering and switching policies for messages received from heterogeneous devices in lower networks via network interfaces;

a device management unit for extracting a second information on the messages, the devices and the network interfaces;

a layer-basis filter unit for performing, based on the first and the second information, the message filtering and switching on the messages on a layer basis; and an integrated switch management unit for providing the first information to the layer-basis filter unit and controlling the layer-basis filtering unit.

Preferably, the second information includes MAC (Medium Access Control) addresses, MAC layer protocol information, IP (Internet Protocol) addresses, identification of the network interfaces and characteristics information of the messages. The layer-basis filter unit may include a switch filter unit for performing, in a MAC layer, the message filtering and switching on the messages according to the MAC addresses and the MAC protocol information; a route filter unit for performing, in a network layer and a transport layer, the message filtering and switching on the messages according to the IP addresses; and a gateway filter unit for performing, in an application layer, the message filtering and switching on the messages according to the characteristics information of the messages.

Preferably, the layer-basis filter unit includes a message conversion unit for performing message conversion between heterogeneous protocols on the messages, and the gateway filter unit determines whether each message is needed to be converted into other protocol or not.

The apparatus may further include a resource management unit for performing resource allocation and management for traffic of the messages.

Preferably, the apparatus groups, if the devices are connected thereto via the lower networks, the devices into broadcasting groups according to device characteristics information of the devices. The device characteristics information of each device may serve as identifiers for identifying a device group based on an IP address of the device, for identifying the device group based on a MAC address of the device and for identifying the device group based on a physical port of the device.

Preferably, the device management unit performs port-filtering the messages to perform, in a physical layer, the message filtering and switching on the messages according to the identification of the network interfaces.

In accordance with another aspect of the present invention, there is provided a communications method, including:

storing therein a first information on message filtering and switching policies for messages received from heterogeneous devices in lower networks via network interfaces;

extracting a second information on the messages, the devices and the network interfaces; and performing, based on the first and the second information, message filtering and switching on the messages on a layer basis.

Preferably, the second information includes MAC (Medium Access Control) addresses, MAC layer protocol information, IP (Internet Protocol) addresses, identification of the network interfaces and characteristics information of the messages. Said performing the message filtering and switching may includes port-filtering the messages to perform, in a physical layer, the message filtering and switching on the messages according to the identification of the network interfaces; switch-filtering the messages to perform, in a MAC layer, the message filtering and switching on the messages according to the MAC addresses and the MAC protocol information; route-filtering the messages to perform, in a network layer and a transport layer, the message filtering and switching on the messages according to the IP addresses; and gateway-filtering the messages to perform, in an application layer, the message filtering and switching on the messages according to the characteristics information of the messages.

Preferably, said switch-filtering the messages includes determining whether the MAC addresses and MAC protocol information are contained in the first information; switching each message in the MAC layer to a route filter or a destination according to the first information, if the MAC addresses and MAC protocol information are contained in the first information; and terminating said switching-filtering each message, if the MAC addresses and MAC protocol information are not contained in the first information.

Preferably, said route-filtering the messages includes determining whether the IP addresses are contained in each stream registered to the first information; checking whether the stream is contained in a system or an approved network protocol registered to the first information, if the IP addresses are contained in each stream registered to the first information; switching each message in the network layer and the transport layer to a gateway filter or a destination according to the first information, if the stream is contained in a system or an approved network protocol registered to the first information; and terminating said route-filtering each message, if the stream is not contained in a system or an approved network protocol registered to the first information.

Preferably, said gateway-filtering the messages includes determining whether the characteristics information of each message is contained in the first information; switching each message in the application layer to each destination according to the first information, if the characteristics information of each message is contained in the first information; and destroying each message, if the characteristics information of the message is not contained in the first information.

Preferably, said switching the messages in the application layer includes determining whether each message is needed to be converted into other protocol or not; and performing message conversion between heterogeneous protocols on each message, if the message is needed to be converted into other protocol.

The method may further include monitoring traffic generated by the devices connected via the lower networks; and performing resource allocation and management on the traffic.

The method may further include grouping, if the devices are connected via the lower networks, the devices into broadcasting groups according to device characteristics information of the devices, wherein the device characteristics information of each device serves as identifiers for identifying a device group based on an IP address of the device, for identifying the device group based on a MAC address of the device and for identifying the device group based on a physical port of the device.

According to the present invention, devices in a ship are connected to an integrated gateway. The integrated gateway analyzes traffic generated the devices connected thereto, approves a message based on analysis result, determines a destination of the approved message and switches the approved message to the destination thereof. Therefore, unlike in conventional gateway systems, unnecessary message delivery and excessive traffic, which cause performance degradation of other devices, can be prevented. Also, access to the devices in the ship by an unapproved user can be prevented.

Further, according to the present invention, resource can be allocated according to service characteristics of a message, thereby satisfying performance needs of each device in a ship.

BRIEF DESCRIPTION OF THE DRAWINGS

The above features of the present invention will become apparent from the following description of embodiments, given in conjunction with the accompanying drawings, in which:

FIGS. 3A and 3B illustrate a flowchart of a communications method using the integrated gateway apparatus of FIG. 2.

DETAILED DESCRIPTION OF THE EMBODIMENTS

Hereinafter, embodiments of the present invention will be described in detail with reference to the accompanying drawings, which form a part hereof.

Figure 1:
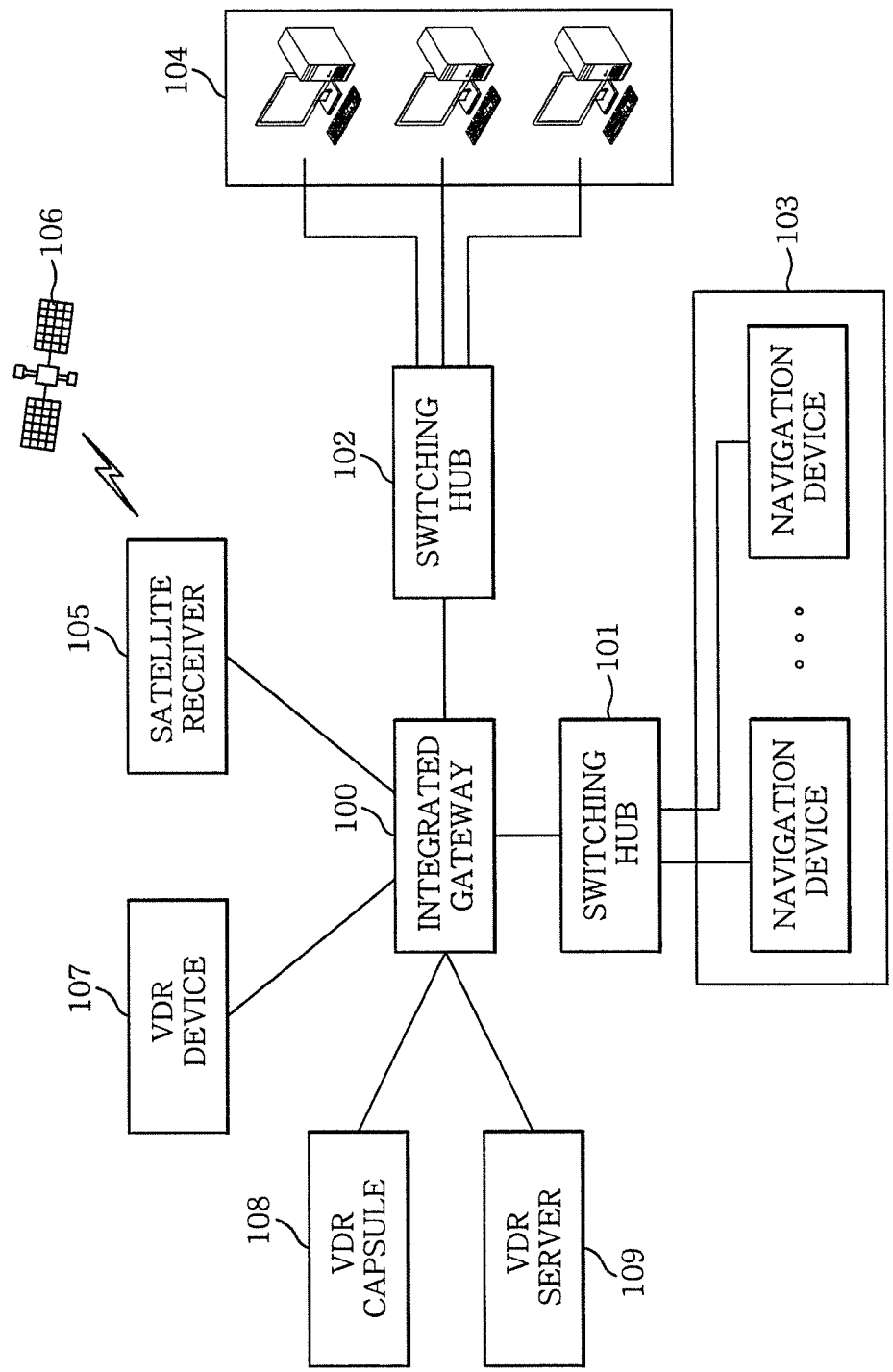
FIG. 1 illustrates an exemplary view of devices in a ship including an integrated gateway apparatus in accordance with an embodiment of the present invention.

FIG. 1 illustrates an exemplary view of devices in a ship including an integrated gateway apparatus in accordance with an embodiment of the present invention.

Devices in a ship may be directly or indirectly connected to an integrated gateway. In the example of FIG. 1, navigation devices 103 and personal computers 104 are connected to an integrated gateway 100 via switching hubs 101 and 102, respectively, while a VDR (Voyage Data Recoder) device 107, a VDR capsule 108, a VDR server 109 are directly connected to the integrated gateway 100. Further, the integrated gateway 100 may communicate with a satellite 106 via a satellite receiver 105 connected thereto. The integrated gateway 100 may perform message switching, message approval and resource allocation for all traffic.

Devices connected to the integrated gateway 100 as described above can be grouped into broadcasting groups according to device characteristics of each device, e.g., identifiers for identifying a device group based on an IP (Internet Protocol) address of the device, for identifying the device group based on a MAC (Medium Access Control) address of the device and for identifying the device group based on a physical port of the device.

Further, the integrated gateway 100 identifies the devices by generating device identification information according to integrated design information, generating device identification information of added devices according to physical information thereof. The integrated gateway 100 generates device identification information by registering device characteristics of each added device and deleting device characteristics of each deleted device.

The integrated gateway 100 sets MAC broadcasting groups according characteristics of the devices, sets IP broadcasting groups according to streams generated by the devices and sets application layer broadcasting groups according to characteristics of messages generated by the devices.

The integrated gateway 100 allocate link bandwidth by monitoring traffic according to types and characteristics of the traffic generated by the devices, allocates a specific amount of bandwidth and network resources to each stream by monitoring traffic generated by the stream and allocates network resources to each message by monitoring traffic generated by the message.

The integrated gateway 100 inspects all frames in a MAC layer, determines whether it approves each frame according to a MAC address and MAC protocol information thereof and switches the approved frame to its destination or an internal application service.

The integrated gateway 100 determines whether to approve each message based on an IP address and TCP/UDP (Transmission Control Protocol/User Datagram Protocol) port information thereof, and switches the approved message to its destination or an internal application service.

The integrated gateway 100 identifies a type of each application message to determine whether to process the message and determines a destination of the approved message. The integrated gateway 100 also determines whether to perform message conversion on the message.

Figure 2:
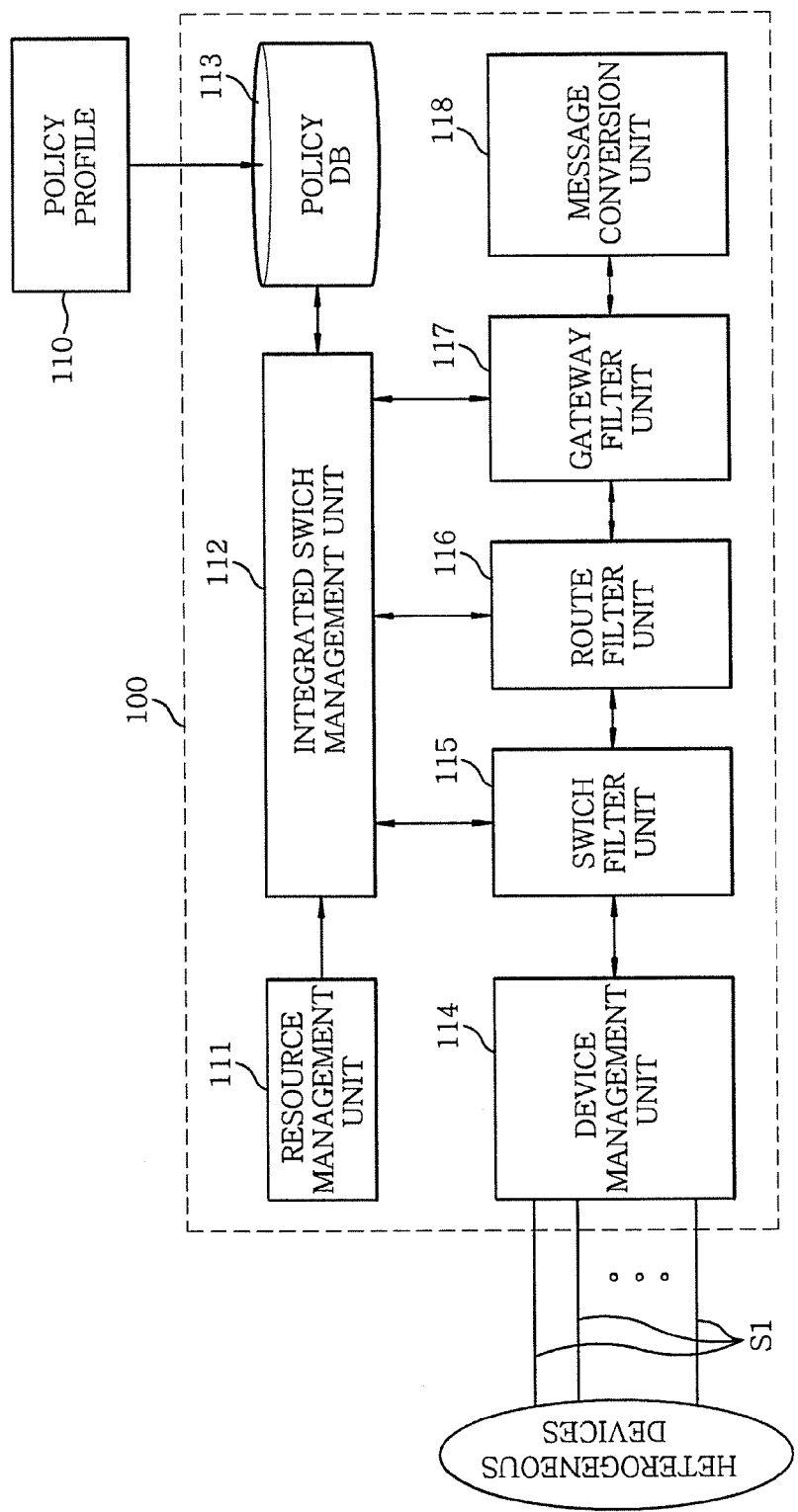
FIG. 2 illustrates a block diagram of the integrated gateway apparatus of FIG. 1.

FIG. 2 illustrates a block diagram of the integrated gateway 100 of FIG. 1.

The integrated gateway 100 includes a resource management unit 111, an integrated switch management unit, a policy DB (database) 113, a device management unit 114, a switch filter unit 115, a route filter unit 116, a gateway filter unit 117 and a message conversion unit 118.

The resource management unit 111 manages network resources in the integrated gateway 100. That is, the resource management unit 111 allocates, for each traffic, a specific amount of resources to message streams to be integratedly switched, and manages thus allocated resources.

The integrated switch management unit 112 manages overall functions of the integrated gateway 100. The integrated switch management unit 112 retrieves switching policy and message filtering policy from the policy DB 113 according to the resource allocation and management of the resource management unit 111, and provides thus retrieved policies to the switch filter unit 115, the route filter unit 116 and the gateway filter unit 117.

The policy DB 113 stores therein switching policy and message filtering policy, which are input from a policy profile 110. The policy DB 113 also stores therein information on user access right and user grade, information on a producer of each device, information on access right to application services and information on access right of each device to resources and networks.

The device management unit 114 transmits and receives message frames between heterogeneous devices in a ship, e.g., the devices 101 to 109 of FIG. 1, via network interfaces S1. The device management unit 114 extracts port information (identification of the network interfaces) and MAC (Medium Access Control) addresses of messages received from the heterogeneous devices via the interfaces S1, and provides thus extracted port information and MAC addresses to the switch filter unit 115. Further, the device management unit 114 provides messages received from the switch filter unit 115 to the heterogeneous devices via the network interfaces S1.

The device management unit 114 also sets MAC broadcasting groups by grouping the heterogeneous devices according to characteristics thereof, IP (Internet Protocol) broadcasting groups by grouping the heterogeneous devices according to streams generated thereby and application layer broadcasting groups by grouping the heterogeneous devices according to characteristics of messages generated thereby.

Further, the device management unit 114 performs traffic monitoring according to a type and characteristics of traffic generated by a specific device among the heterogeneous devices to allocate an appropriate link bandwidth. The device management unit 114 also performs traffic monitoring on streams generated by the heterogeneous devices to allocate an appropriate bandwidth and network resources to each stream, and performs traffic monitoring on application messages generated by the heterogeneous devices to allocate appropriate network resources to each message.

Furthermore, the device management unit 114 performs port-filtering the messages to perform, in a physical layer, the message filtering and switching on the messages according to the identification of the network interfaces.

The switch filter unit 115 performs message filtering and switching on MAC layer messages. The switch filtering unit 115 determines whether to perform message switching using MAC addresses according to the message filtering policy and switching policy received from the integrated switch management unit 112, thereby switching the messages between the device management unit 114 and the route filter unit 116. The message filtering policy may include a policy on approved messages and messages to be blocked in MAC layer.

In the case of a message, including a MAC broadcasting message and a multicasting message, which does not contain any MAC switching information, the switch filter unit 115 terminates the message switching.

The route filter unit 116 performs message filtering and switching on network layer and transport layer messages. The route filter unit 116 extracts IP addresses and TCP/UDP (Transmission Control Protocol/User Datagram Protocol) port information of messages between the switch filter unit 115 and the gateway filter unit 117, thereby switching the messages between the switch filter unit 115 and the gateway filter unit 117 according to the message filtering policy and switching policy received from the integrated switch management unit 112.

To be specific, the route filter unit 116 checks, based on thus extracted IP addresses or port information, whether streams are registered to the policy DB 113 via the integrated switch management unit 112. If it is determined that a stream is registered to the policy DB 113, the route filter unit 116 determines whether to perform message switching by checking whether a system is registered to the policy DB 113 or whether a network protocol is approved protocol, e.g., ARP (Address Resolution Protocol) and SNMP (Simple Network Management Protocol). Then, the route filter unit 116 performs message routing, or provides the message to the gateway filter unit 117.

If it is determined that a stream is not registered to the policy DB 113, the route filter unit 116 terminates the message switching.

The gateway filter unit 117 performs message filtering and switching on application layer messages. The gateway filter unit 117 provides to the message conversion unit 118 messages determined to be switched according to the message filtering policy and switching policy received from the integrated switch management unit 112. The gateway filter unit 117 provides to the route filter unit 116 message having been subjected to message conversion between heterogeneous protocols in the message conversion unit 118.

To be specific, the gateway filter unit 117 acquires switching information on an application message stored in the policy DB 113 via the integrated switch management unit 112. If it is determined that the message is an approved message, the gateway filter unit 117 performs message switching by using information on a destination of the message. At this time, the gateway filter unit 117 provides the message to the message conversion unit 118 when necessary. If it is determined that the message is not an approved message, the gateway filter unit 117 destroys the message.

The gateway filter unit 117 inspects all frames in MAC layer according to the message filtering policy and switching policy received from the integrated switch management unit 112. The gateway filter unit 117 determines whether it approves the frames or not according to MAC addresses and MAC protocol information, and provides approved frames to destination ports or internal application services.

The gateway filter unit 117 determines, based on IP addresses and TCP/UDP port information, whether it approves messages or not according to the message filtering policy and switching policy received from the integrated switch management unit 112, and provides approved messages to destination devices or internal application services.

The gateway filter unit 117 identifies types of application messages according to the message filtering policy and switching policy received from the integrated switch management unit 112 to determine how to process the messages, and also determines destination application services of the messages or whether to convert the messages into other protocol messages or not.

The message conversion unit 118 performs message conversion between heterogeneous protocols on messages received from the gateway filter unit 117, and returns thus converted messages to the gateway filter unit 117.

Hereinafter, a communications method using the above-described integrated gateway will be described in detail.

Figure 3A:
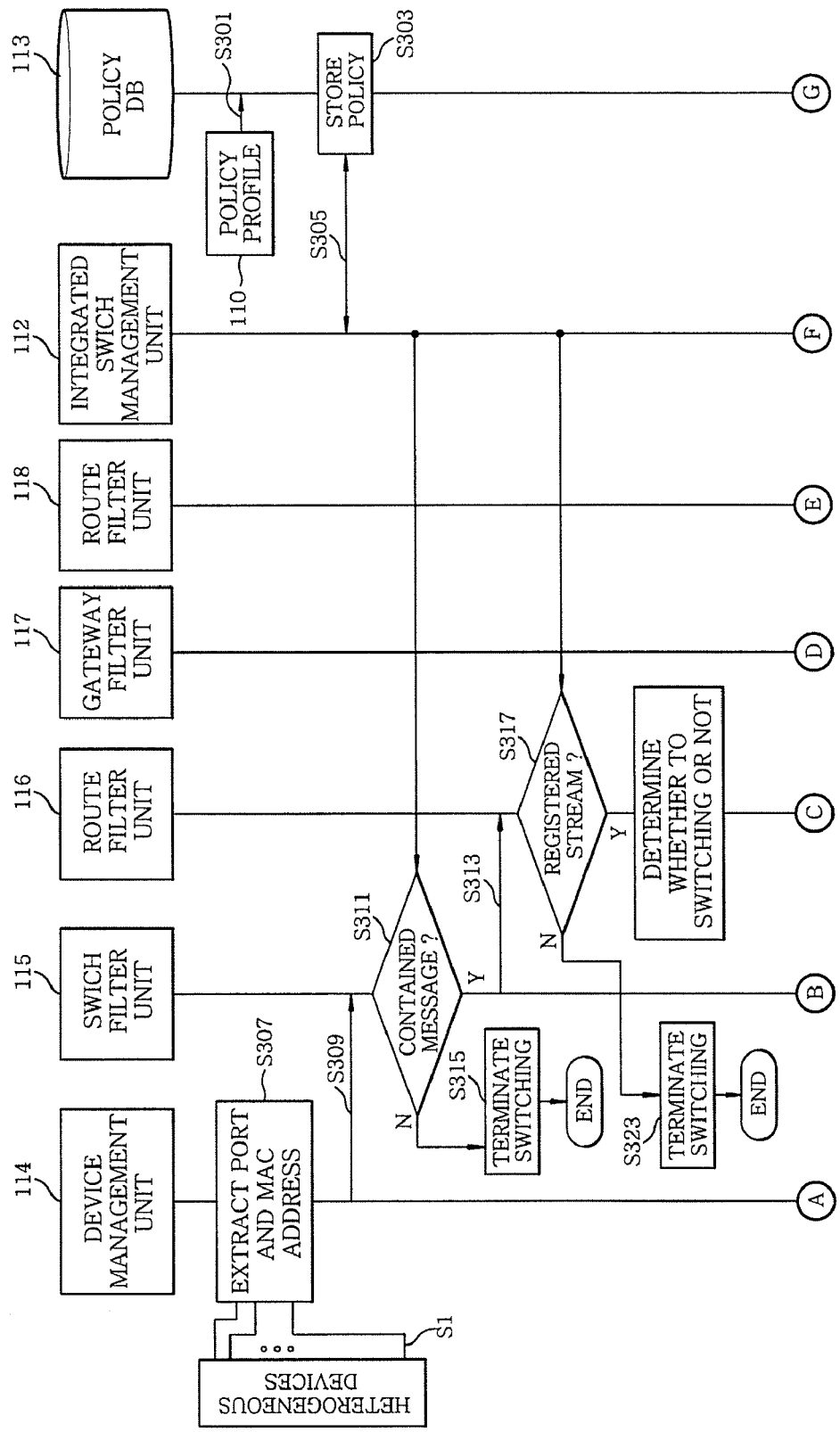

FIGS. 3A and 3B illustrate a flowchart of a communications method using the integrated gateway 100 of FIG. 2.

First, the policy profile 110 provides switching policy and message filtering policy to the policy DB 113 in the integrated gateway 100 (step S301). The policy DB 113 stores therein thus received switching policy and message filtering policy (step S303).

The integrated switch management unit 112 retrieves the switching policy and message filtering policy from the policy DB 113 according to resource allocation and management of the resource management unit 111 (step S305) The integrated switch management unit 112 provides thus retrieved switching policy and message filtering policy to the switch filter unit 115, the route filter unit 116 and the gateway filter unit 117, thereby allowing the switch filter unit 115, the route filter unit 116 and the gateway filter unit 117 to perform corresponding filtering.

The device management unit 114 in the integrated gateway 100 extracts a port and MAC addresses of a message received from a heterogeneous device via a corresponding network interface S1 (step S307), and then provides thus extracted port and MAC addresses to the switch filter unit 115 (step S309). Here, the port extracted in the step S307 denotes identification of the network interface S1, and the device management unit 114 may perform port-filtering the messages to perform, in a physical layer, the message filtering and switching on the message according to the identification of the network interface S1.

The switch filter unit 115 determines, according to the switching policy and message filtering policy received from the integrated switch management unit 112, whether the message received from the device management unit 114 is a message contained in MAC switching information, e.g., a MAC broadcasting message and a multicasting message (step S311).

If it is determined in the step S311 that the message is contained in the MAC switching information, the switch filter unit 115 provides the message received from the device management unit 114 to the route filter unit 116 (step S313). If it is determined in the step S311 that the message is not contained in the MAC switching information, the switch filter unit 115 terminates switching operation (step S315).

The route filter unit 116 checks, based on an IP addresses of TCP/UDP port information of the message, whether the message received from the switch filter unit 115 corresponds to a stream registered to the policy DB 113 (step S317). If it is determined in the step S317 that the message corresponds to a registered stream, the route filter unit 116 checks a protocol of the message is a network protocol registered to the policy DB 113 to determine whether to perform switching on the message or not (step S319). Then, the route filter unit 116 provides the message to the gateway filter unit 117 (step S321). If it is determined in the step S317 that the message does not correspond to a registered stream, the route filter unit 116 terminates switching operation (step S323).

The gateway filter unit 117 acquires switching information on application messages stored in the policy DB 113 to check whether the message received from the route filter unit 116 is approved or not (step S325).

If it is determined in the step S325 that the message is an approved message, the gateway filter unit 117 performs switching on the message received from the route filter unit 116 based on destination information of the message, and at this time, determines whether message conversion is necessary or not (step S327).

If it is determined in the step S327 that the message conversion is necessary, the gateway filter unit 117 provides the message to the message conversion unit 118 to perform message conversion between heterogeneous protocols on the message (step S329). The converted message is sequentially switched to the route filter unit 116, the switch filter unit 115 and the device management unit 114, and finally switched to its destination via a corresponding network interface S1 (step S331).

Meanwhile, if it is determined in the step S327 that the message conversion is not necessary, the message is, without being converted, sequentially switched to the route filter unit 116, the switch filter unit 115 and the device management unit 114, and finally switched to its destination via a corresponding network interface S1 (step S333).

If it is determined in the step S325 that the message is not an approved message, the gateway filter unit 117 destroys the message received from the route filter unit 116 (step S335).

While the invention has been shown and described with respect to the embodiments, it will be understood by those skilled in the art that various changes and modification may be made without departing from the scope of the invention as defined in the following claims.

What is claimed is:

1. An integrated gateway apparatus, the apparatus comprising:
   a policy storage for storing therein a first information on message filtering and switching policies for messages received from heterogeneous devices in lower networks via network interfaces;
   a device management unit for extracting a second information on the messages, the devices and the network interfaces;
   a layer-basis filter unit for performing, based on the first and the second information, the message filtering and switching on the messages on a layer basis; and
   an integrated switch management unit for providing the first information to the layer-basis filter unit and controlling the layer-basis filtering unit,
   wherein the second information includes MAC addresses, MAC (Medium Access Control) layer protocol information, IP (Internet Protocol) addresses, identification of the network interfaces and characteristics information of the messages; and wherein the layer-basis filter unit includes:
   a switch filter unit for performing, in a MAC layer, the message filtering and switching on the messages according to the MAC addresses and the MAC protocol information;
   a route filter unit for performing, in a network layer and a transport layer, the message filtering and switching on the messages according to the IP addresses; and a gateway filter unit for performing, in an application layer, the message filtering and switching on the messages according to the characteristics information of the messages.

2. The apparatus of claim 1, wherein the layer-basis filter unit includes a message conversion unit for performing message conversion between heterogeneous protocols on the messages, and wherein the gateway filter unit determines whether each message is needed to be converted into other protocol or not.

3. The apparatus of claim 1, further comprising:
a resource management unit for performing resource allocation and management for traffic of the messages.

4. The apparatus of claim 1, wherein the device management unit performs port-filtering the messages to perform, in a physical layer, the message filtering and switching on the messages according to the identification of the network interfaces.

5. The apparatus of claim 1, wherein the apparatus groups, if the devices are connected thereto via the lower networks, the devices into broadcasting groups according to device characteristics information of the devices; and wherein the device characteristics information of each device serves as identifiers for identifying a device group based on an IP address of the device, for identifying the device group based on a MAC address of the device and for identifying the device group based on a physical port of the device.

6. An integrated gateway apparatus, the apparatus comprising:
a policy storage for storing therein a first information on message filtering and switching policies for messages received from heterogeneous devices in lower networks via network interfaces;
a device management unit for extracting a second information on the messages, the devices and the network interfaces;
a layer-basis filter unit for performing, based on the first and the second information, the message filtering and switching on the messages on a layer basis; and
an integrated switch management unit for providing the first information to the layer-basis filter unit and controlling the layer-basis filtering unit,
wherein the apparatus groups, if the devices are connected thereto via the lower networks, the devices into broadcasting groups according to device characteristics information of the devices; and wherein the device characteristics information of each device serves as identifiers for identifying a device group based on an IP address of the device, for identifying the device group based on a MAC address of the device and for identifying the device group based on a physical port of the device.

7. The apparatus of claim 6, wherein the layer-basis filter unit includes a message conversion unit for performing message conversion between heterogeneous protocols on the messages, and wherein the gateway filter unit determines whether each message is needed to be converted into other protocol or not.

8. The apparatus of claim 6, further comprising:
a resource management unit for performing resource allocation and management for traffic of the messages.

9. The apparatus of claim 6, wherein the device management unit performs port-filtering the messages to perform, in a physical layer, the message filtering and switching on the messages according to the identification of the network interfaces.

10. A communications method, comprising:
storing therein a first information on message filtering and switching policies for messages received from heterogeneous devices in lower networks via network interfaces;
extracting a second information on the messages, the devices and the network interfaces; and
performing, based on the first and the second information, message filtering and switching on the messages on a layer basis,
wherein the second information includes MAC (Medium Access Control) addresses, MAC layer protocol information, IP (Internet Protocol) addresses, identification of the network interfaces and characteristics information of the messages; and wherein said performing the message filtering and switching includes:
port-filtering the messages to perform, in a physical layer, the message filtering and switching on the messages according to the identification of the network interfaces;
switch-filtering the messages to perform, in a MAC layer, the message filtering and switching on the messages according to the MAC addresses and the MAC protocol information;
route-filtering the messages to perform, in a network layer and a transport layer, the message filtering and switching on the messages according to the IP addresses; and
gateway-filtering the messages to perform, in an application layer, the message filtering and switching on the messages according to the characteristics information of the messages.

11. The method of claim 10, wherein said switch-filtering the messages includes:
determining whether the MAC addresses and MAC protocol information are contained in the first information;
switching each message in the MAC layer to a route filter or a destination according to the first information, if the MAC addresses and MAC protocol information are contained in the first information; and
terminating said switching-filtering each message, if the MAC addresses and MAC protocol information are not contained in the first information.

12. The method of claim 10, wherein said route-filtering the messages includes:
determining whether the IP addresses are contained in each stream registered to the first information;
checking whether the stream is contained in a system or an approved network protocol registered to the first information, if the IP addresses are contained in each stream registered to the first information;
switching each message in the network layer and the transport layer to a gateway filter or a destination according to the first information, if the stream is contained in a system or an approved network protocol registered to the first information; and
terminating said route-filtering each message, if the stream is not contained in a system or an approved network protocol registered to the first information.

13. The method of claim 10, wherein said gateway-filtering the messages includes:
determining whether the characteristics information of each message is contained in the first information;
switching each message in the application layer to each destination according to the first information, if the characteristics information of each message is contained in the first information; and
destroying each message, If the characteristics information of the message is not contained in the first information.

14. The method of claim 13, wherein said switching the messages in the application layer includes:
- determining whether each message is needed to be converted into other protocol or not; and
- performing message conversion between heterogeneous protocols on each message, if the message is needed to be converted into other protocol.

15. The method of claim 10, further comprising:
- monitoring traffic generated by the devices connected via the lower networks; and
- performing resource allocation and management on the traffic.

16. The method of claim 10, further comprising:
- grouping, if the devices are connected via the lower networks, the devices into broadcasting groups according to device characteristics information of the devices,
- wherein the device characteristics information of each device serves as identifiers for identifying a device group based on an IP address of the device, for identifying the device group based on a MAC address of the device and for identifying the device group based on a physical port of the device.

\* \* \* \* \*